May 17, 1932.  W. E. STRAIT  1,859,248
COIL AND METHOD OF ASSEMBLY
Filed Oct. 10, 1930

Inventor
Wilber E. Strait
By his Attorneys
Emery, Booth, Varney & Whittemore

Patented May 17, 1932

1,859,248

UNITED STATES PATENT OFFICE

WILBER E. STRAIT, OF FORT WAYNE, INDIANA, ASSIGNOR TO GENERAL CABLE CORPORATION, OF NEW YORK, N. Y., A CORPORATION OF NEW JERSEY

COIL AND METHOD OF ASSEMBLY

Application filed October 10, 1930. Serial No. 487,682.

This invention relates to electrical coil structures and to a method of assembling such coil structures. Among the objects of the invention are the provision of an improved coil and of an improved method of assembling a coil. Other objects and advantages of the invention will appear hereinafter.

Figure 1:
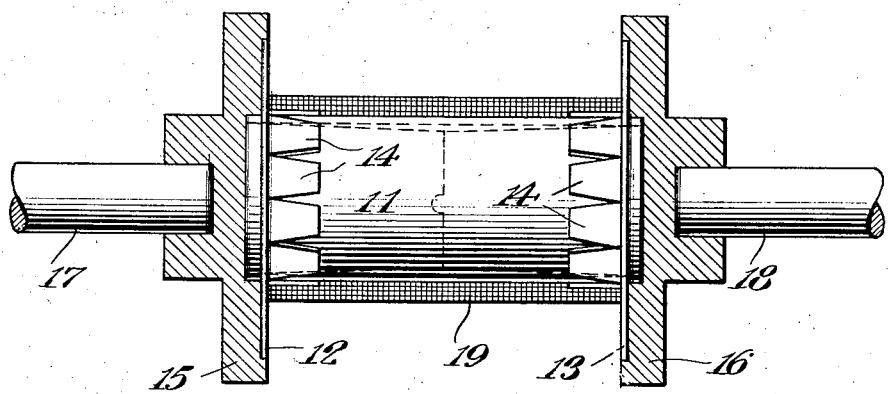
Figure 2:
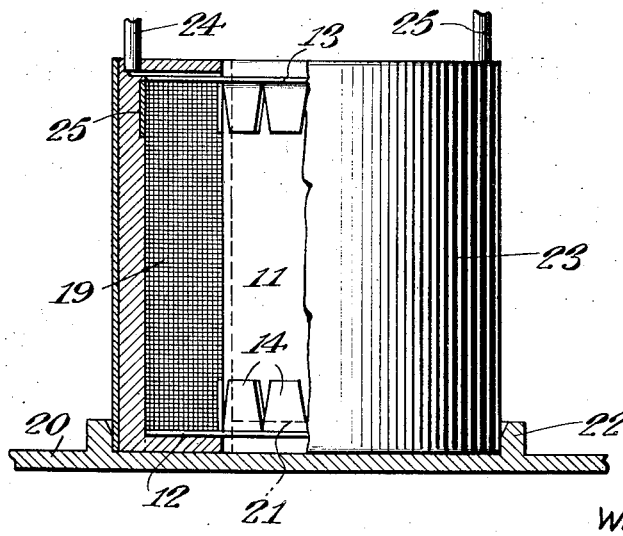

The nature and objects of the invention will be better understood from a description of a particular illustrative embodiment thereof, and for the purpose of such description reference should be had to the accompanying drawings forming a part hereof, and in which:

Fig. 1 is a view largely in section of a partially assembled coil mounted on a winding mandrel; and Fig. 2 is an elevation of a complete coil structure on an assembly platform, a portion of the coil being broken away to provide a longitudinal sectional view.

In winding certain types of electrical coils, and more particularly certain types of fine wire electrical coils, it is customary to wind the wire in a plurality of overlying layers on a spool or bobbin, usually of insulating material. In coils of this type the spool serves as a support to preserve the shape of the coil during the coil finishing operations and during shipment and installation, and also to protect, at least to a limited extent, the turns of the coil during these operations against physical injury which might affect the electrical characteristics of the coil or injure it beyond repair.

After the coil has been wound on the spool the end of the winding is anchored, and the terminal leads are attached to the ends of the coil winding. The end of the coil winding and the terminal leads commonly are anchored or secured to the coil by means of stickers or tapes, and if the end flanges of the spool are flexible the same stickers or tapes, or additional securing means, secure the end flanges in place against the ends of the coil winding. The outer surface of the coil then is covered with suitable insulating material, ordinarily by wrapping on paper or varnished cloth. Coils as thus described may prove serviceable and satisfactory in operation, but are expensive and require considerable care in manufacture, handling and installing to prevent damage to the coil winding. The means securing the terminal leads and end flanges may become displaced, the end flanges may move or bend permitting the end turns of the coil winding to slip, or the turns of the winding may be broken or otherwise damaged. Furthermore, such coils exhibit an untoward appearance because of the stickers and tapes used in securing the terminals and the end flanges, and the outer surfaces of the coils are irregular and vary slightly in dimensions.

According to this invention a coil structure is provided in which the coil winding is completely protected against injury, in which the dimensions of each similar coil structure are the same, in which the coils are adequately insulated electrically without provision of external insulating wrappings, and in which the appearance of the coil structure is materially improved. Handling of the coils is expedited, and the possibility of injury is greatly reduced. The invention is applicable to field coils for electro-dynamic sound reproducers.

Referring to the drawings, and first to Fig. 1, the spool upon which the coil of the illustrative embodiment is wound comprises a rigid cylindrical tube 11 which preferably is of insulating material, for example paper. On the tubular support 11, adjacent but spaced slightly inwardly from the ends thereof, are two end flanges 12 and 13. Conveniently, these end flanges may be formed from somewhat flexible sheets of insulating material, and are provided along their inner edges with angularly bent tongues 14 projecting inwardly along and lightly gripping the tubular support 11. The end flanges 12 and 13 are positioned on the tubular support 11, and the tubular support is then placed on a suitable winding arbor. As shown in Fig. 1, the arbor comprises two end plates 15 and 16, secured on the ends of shafts 17 and 18, which shafts are mounted in suitable bearings, (not shown) and to one of which may be connected suitable means, (not shown) for rotating the arbor. The end plates 15 and 16 are recessed on their inner faces to receive the ends of the tubular support 11 extending beyond the flanges 12 and 13, and also to receive the flanges 12 and 13 substantially flush with the inner faces of the plates 15 and 16. The plates 15 and 16 also are provided with hubs closely engaging the inner surface of the tubular support 11 to hold the spool and to prevent turning movement between the spool and the arbor.

After the spool has been assembled on the arbor a short length of the wire from which the coil is to be wound is drawn through between the tubular support and the inner edge of one of the end flanges 12 and 13, and is wound around the tubular support between the flange and the adjacent end plate to provide a lead for the coil terminal. The end flanges 12 and 13 then are moved outwardly along the tubular support 11 until they enter the recesses in the plates 15 and 16. The arbor then is rotated and the wire is wound on the spool between the end flanges in a plurality of overlying layers, forming the coil winding 19. When the coil winding is completed the wire is severed and the end of the winding is secured in place as by means of a sticker or tape 25.

The coil then is removed from the mandrel and positioned on a platform 20, (Fig. 2) with its longitudinal axis extending vertically. Preferably the platform 20 is provided with a cylindrical projection 21 for closely engaging the lower end of the tubular support 11 to prevent movement of the coil on the platform. Coaxially surrounding the cylindrical projection 21 is an annular ridge 22, whose inner diameter is greater than the outer diameter of the end flanges 12 and 13. An open-ended cylindrical shell 23, preferably of insulating material such as paper, is then positioned about the coil, the lower end of the shell 23 resting on the platform 20 and engaging the inner surface of the annular ridge 22 to position the shell 23 co-axially about the coil. Preferably the shell 23 is slightly longer than the spacing between the end flanges 12 and 13, and conveniently the shell may be of the same length as the tubular support 11. The coil terminals 24 and 25 are drawn upwardly through the open end of the shell 23. Conveniently the shell 23 may carry on its outer surface printed information relating to the characteristics and manufacture of the coil.

Insulating compound which is hard at atmospheric temperatures and at all normal temperatures to which the coil will be subjected in service is poured in a molten state into the shell 23 to completely fill the space between the platform 20 and the end flange 12, between the body 19 of the coil winding and the shell 23, and over the end flange 13 between the shell 23 and the tubular support 11. The compound is then allowed to cool and harden, after which the completed coil structure may be lifted from the platform 20. In the completed coil, the coil winding 19 is protected on its inner surface by the supporting tubular member 11, on its outer surface by the layer of hardened insulating compound and the shell 23, and at its ends by the flanges 12 and 13 and layers of hardened insulating compound. The coil winding is completely enclosed, and is protected against moisture and gas as well as against mechanical injury. The usual insulating wrappings are eliminated.

It will be seen that applicant has provided an improved coil structure, and an improved method of assembling coil structures. While the invention has been described with reference to a particular illustrative embodiment, it will be understood that the invention may be variously modified and embodied within the scope of the claims.

Claims:

1. An electrical coil structure comprising, in combination, a tubular winding support, end flanges positioned on said support spaced slightly inwardly from the ends thereof and provided along their inner edges with angularly bent tongues projecting inwardly along said support, a coil winding comprising a plurality of overlying layers of fine wire wound on said support between said end flanges and overlying said tongues, the ends of said coil winding being supported by said end flanges and permanently securing said end flanges on said support, a thin tubular shell longer than the distance between the end flanges co-axially, loosely enclosing said coil winding, and a body of hardened insulating compound filling the space between said shell and the coil winding and overlying the end flanges between the tubular support and the shell, whereby the coil winding is embedded in the hardened insulating compound between the tubular support and the shell.

2. An electrical coil structure comprising, in combination, a tubular winding support, end flanges positioned on said support spaced slightly inwardly from the ends thereof, a coil winding comprising a plurality of overlying layers of fine wire wound on said support between said end flanges, a thin tubular shell longer than the distance between the end flanges co-axially, loosely enclosing said coil winding, and a body of hardened insulating compound filling the space between said shell and the coil winding and overlying the end flanges between the tubular support and the shell, whereby the coil winding is embedded in the hardened insulating compound between the tubular support and the shell.

3. An electrical coil structure comprising, in combination, a tubular winding support, end flanges positioned on said support adjacent the ends thereof, a coil winding comprising a plurality of overlying layers of fine wire wound on said support between said end flanges, a thin open-ended tubular shell co-axially, loosely enclosing said coil winding, and a body of hardened insulating compound filling the space between said shell and the coil winding, whereby the coil winding is secured firmly in the said shell and is protected by the layer of hardened insulating compound between the coil winding and the shell.

4. An electrical coil structure comprising, in combination, a tubular winding support, a coil winding comprising a plurality of overlying layers of fine wire wound on said support, said coil winding being shorter than said support, a thin tubular shell of substantially the same length as said tubular support co-axially, loosely enclosing said coil winding, and a body of hardened insulating compound filling the space between said shell and the coil winding, whereby the coil winding is secured firmly in the said shell and is protected by the layer of hardened insulating compound between the coil winding and the shell.

5. The method of assembling an electrical coil structure which comprises assembling two flexible end flanges on a tubular winding support, adjusting said flanges adjacent but spaced slightly inwardly from the ends of said support, winding the coil in a plurality of overlying layers on said support between the end flanges while supporting the end flanges against distortion, and thereby permanently securing the end flanges in adjusted position on said support, attaching terminals to the ends of the coil winding, placing said coil with one end of the support resting on a platform, positioning a thin tubular member of substantially the same length as said support and of slightly greater diameter than said end flanges over said coil and drawing said terminals out through the upper end of the tubular member, centering said tubular member co-axially with said coil, filling all of the space between the lower end flange and the support, between the coil winding and the tubular member, and over the upper end flange between the tubular member and the tubular support with an insulating compound, and causing said compound to harden, whereby the coil winding is protected against injury and sealed against ingress of gas and moisture.

6. The method of assembling an electrical coil structure on a tubular support having end flanges which comprises winding the coil on said support between said end flanges in a plurality of overlying layers, positioning a thin open-ended tubular shell surrounding said coil at a narrow interval co-axially around said coil, drawing the coil terminals out through an end of the shell, filling the space between the coil winding and the shell and over the end flanges with an insulating compound while leaving the ends of the said tubular support open, and causing said compound to harden whereby the coil winding is firmly embedded between said support and said shell and is protected over its exposed outer surface and at its ends by walls of hardened insulating compound.

7. An electrical coil structure comprising, in combination, a tubular winding support, a coil winding comprising a plurality of overlying layers of wire wound on said support, flanges secured on said tubular support protecting and supporting the ends of the coil winding, and a wall of hardened insulating compound surrounding said coil winding firmly securing the outer layers of the winding in position and protecting the winding electrically and mechanically while leaving the interior of the tubular winding support open.

8. A field coil for an electro-dynamic sound reproducer comprising, in combination, a tubular winding support, a coil winding comprising a plurality of overlying layers of wire wound on said support, a wall of hardened insulating compound enclosing the outer and end surfaces of said coil winding while leaving the interior of the tubular winding support open, and a thin tubular shell closely surrounding the said wall of insulating compound and providing protection against mechanical injury.

In testimony whereof, I have signed my name to this specification this 8th day of October, 1930.

WILBER E. STRAIT.